(12) United States Patent
Singh et al.

(10) Patent No.: US 11,595,276 B2
(45) Date of Patent: Feb. 28, 2023

(54) SYSTEM AND METHOD FOR AUTOMATIC DETECTION OF THIRD PARTY PROXY NETWORK TRAFFIC

(71) Applicant: Citrix Systems, Inc., Fort Lauderdale, FL (US)

(72) Inventors: Vikramjeet Singh, Bangalore (IN); Rishabh Agarwal, Bangalore (IN); Dhawal Patel, Uttar Pradesh (IN)

( * ) Notice: Subject to any disclaimer, the term of this patent is extended or adjusted under 35 U.S.C. 154(b) by 0 days.

(21) Appl. No.: 17/385,124

(22) Filed: Jul. 26, 2021

(65) Prior Publication Data

US 2023/0023004 A1    Jan. 26, 2023

(51) Int. Cl.
*G06F 16/951* (2019.01)
*H04L 43/06* (2022.01)

(52) U.S. Cl.
CPC ............ *H04L 43/06* (2013.01); *G06F 16/951* (2019.01)

(58) Field of Classification Search
None
See application file for complete search history.

(56) References Cited

U.S. PATENT DOCUMENTS

| | | | |
|---|---|---|---|
| 10,887,348 B1* | 1/2021 | Brandwine | H04L 63/20 |
| 2003/0217173 A1* | 11/2003 | Butt | H04L 9/40 709/225 |
| 2010/0131582 A1* | 5/2010 | Driscoll | H04W 48/17 709/227 |
| 2016/0127241 A1* | 5/2016 | Hwang | H04L 41/0893 370/237 |
| 2017/0150337 A1* | 5/2017 | Bareket | H04L 67/104 |
| 2017/0318100 A1* | 11/2017 | Levi | H04L 63/107 |
| 2018/0331957 A1* | 11/2018 | Ardeli | H04L 47/20 |

* cited by examiner

*Primary Examiner* — Joshua Joo

(57) ABSTRACT

Automatically detecting whether sessions are routed through proxy servers is provided. The system identifies a log with session information generated by a device for a session established between a client and a server traversing the device. The system compares a source internet protocol ("IP") address for the session identified from the log with IP addresses of proxy servers. The system updates, responsive to a match based on the comparison, the log with an indication that the session was routed through a proxy server.

17 Claims, 5 Drawing Sheets

SYSTEM AND METHOD FOR AUTOMATIC DETECTION OF THIRD PARTY PROXY NETWORK TRAFFIC

BACKGROUND

In enterprise networks, a gateway service is usually used to provide secure and remote access to web application, virtual applications and/or software as a service (SaaS) applications among other applications. The gateway service can be a cloud service and can implemented via one or more gateway servers. Network traffic associated with the web application, virtual applications and/or software as a service (SaaS) applications among other applications is routed through the one or more gateway servers.

SUMMARY

This technical solution is directed towards systems and methods to automatically detect that network traffic, such as Citrix independent computing architecture (Citrix ICA) traffic, of virtual applications and/or desktop clients among other applications is routed through third party proxy servers. The detection can be based on comparing the source Internet Protocol (IP) address reported by a gateway service against classless inter-routing domain (CIDR) addresses registered by third party proxies maintained in a database. For example, a data processing system can monitor events reported by the gateway service and compare source IP addresses associated with the events against registered CIDR addresses of third party proxies. Upon detecting a match, the data processing system can store an indication that a corresponding session is routed through a third party proxy server.

The data processing system may quantify the impact of routing the session though the third party proxy server on user experience, and may report the results, for example, as part of analytics data. The data processing system may report the results to a system administrator, an information technology (IT) personnel or other entity. The data processing system may recommend configuring the gateway service as an exception to routing through third party proxies to prevent such routing of sessions associated with virtual applications and/or desktop clients among other applications. Such configuration allows for avoiding the impact of routing the sessions through third party proxies and improving session performance as well as user experience.

At least one aspect is directed to a method of automatically detecting whether sessions are routed through proxy servers. The method can include a data processing system comprising one or more processors and memory identifying a log with session information generated by a device for a session established between a client and a server traversing the device. The method can include the data processing system comparing a source internet protocol ("IP") address for the session identified from the log with IP addresses of proxy servers. The method can include the data processing system updating, responsive to a match based on the comparison, the log with an indication that the session was routed through a proxy server.

In implementations, the method can include the data processing system crawling a plurality of web pages to identify domain addresses registered for the proxy servers. The method can include the data processing system extrapolating the domain addresses to identify the IP addresses of the proxy servers. The method can include the data processing system generating a data structure with the IP addresses extrapolated from the domain addresses in the data structure. The data processing system can crawl the plurality of web pages based on a time interval.

The method can include the data processing system determining geographic locations of the proxy servers. The method can include the data processing system blocking, responsive to the session being anomalous, the subsequent requests received from the client device during the session.

In some implementations, the method can include the data processing system updating the log to include a geographic location of the proxy server. In some implementations, the method can include the data processing system generating an alert based on the session information in the updated log to modify a routing configuration of the device that generated the log.

In some implementations, the log can include a plurality of records for a plurality of sessions between a plurality of client devices and a plurality of servers. The method can include the data processing system updating a first subset of the plurality of records for a first subset of the plurality of sessions with an indication that the first subset of the plurality of sessions were routed through one or more proxy servers based on source IP addresses of the first subset of the plurality of sessions matching one or more IP addresses of the proxy servers. The method can include the data processing system generating a proxy performance metric based on the session information stored in the first subset of the plurality of records. The method can include the data processing system generating a threshold performance metric based on the session information stored in a second subset of the plurality of records corresponding to a second subset of sessions that were not routed through any of the proxy servers.

The method can include the data processing system generating an alert based on a comparison between the proxy performance metric and the threshold performance metric. The method can include the data processing system generating a dashboard reporting the proxy performance metric and the threshold performance metric.

At least one aspect is directed to a system to automatically detect whether sessions are routed through proxy servers. The system can include a data processing system comprising one or more processors and memory. The data processing system can identify a log with session information generated by a device for a session established between a client and a server traversing the device. The data processing system can compare a source internet protocol ("IP") address for the session identified from the log with IP addresses of proxy servers. The data processing system can update, responsive to a match based on the comparison, the log with an indication that the session was routed through a proxy server.

In implementations, the data processing system can crawl a plurality of web pages to identify domain addresses registered for the proxy servers. The data processing system can extrapolate the domain addresses to identify the IP addresses of the proxy servers. The data processing system can generate a data structure with the IP addresses extrapolated from the domain addresses in the data structure. The data processing system can crawl the plurality of web pages based on a time interval. The data processing system can further determine geographic locations of the proxy servers, and associate the geographic locations with the IP addresses in the data structure.

In some implementations, the data processing system can update the log to include a geographic location of the proxy server. In some implementations, the data processing system can generate an alert based on the session information in the updated log to modify a routing configuration of the device that generated the log.

In some implementations, the log can include a plurality of records for a plurality of sessions between a plurality of client devices and a plurality of servers. The data processing system can update a first subset of the plurality of records for a first subset of the plurality of sessions with an indication that the first subset of the plurality of sessions were routed through one or more proxy servers based on source IP addresses of the first subset of the plurality of sessions matching one or more IP addresses of the proxy servers. The data processing system can generate a proxy performance metric based on the session information stored in the first subset of the plurality of records. The data processing system can generate a threshold performance metric based on the session information stored in a second subset of the plurality of records corresponding to a second subset of sessions that were not routed through any of the proxy servers.

At least one aspect is directed to a non-transitory computer-readable medium comprising processor executable instructions that, when executed, cause one or more processors to maintain, via continuous web crawling, a data structure with IP addresses of proxy servers and associated geographic locations of the proxy servers. The executable instructions can cause the one or more processors to receive one or more logs for sessions between a plurality of clients and a plurality of servers that traverse one or more devices. The executable instructions can cause the one or more processors to update, based on a comparison between source IP addresses stored in the one or more logs and the IP addresses maintained in the data structure, the one or more logs with an indication that a session was routed through a proxy server of the proxy servers and the associated geographic location.

In implementations, the executable instructions can cause the one or more processors to determine that a performance of the session is degraded relative to a performance of sessions of the one or more logs not routed through any proxy servers, and generate an alert responsive to the determination that the performance of the session is degraded.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
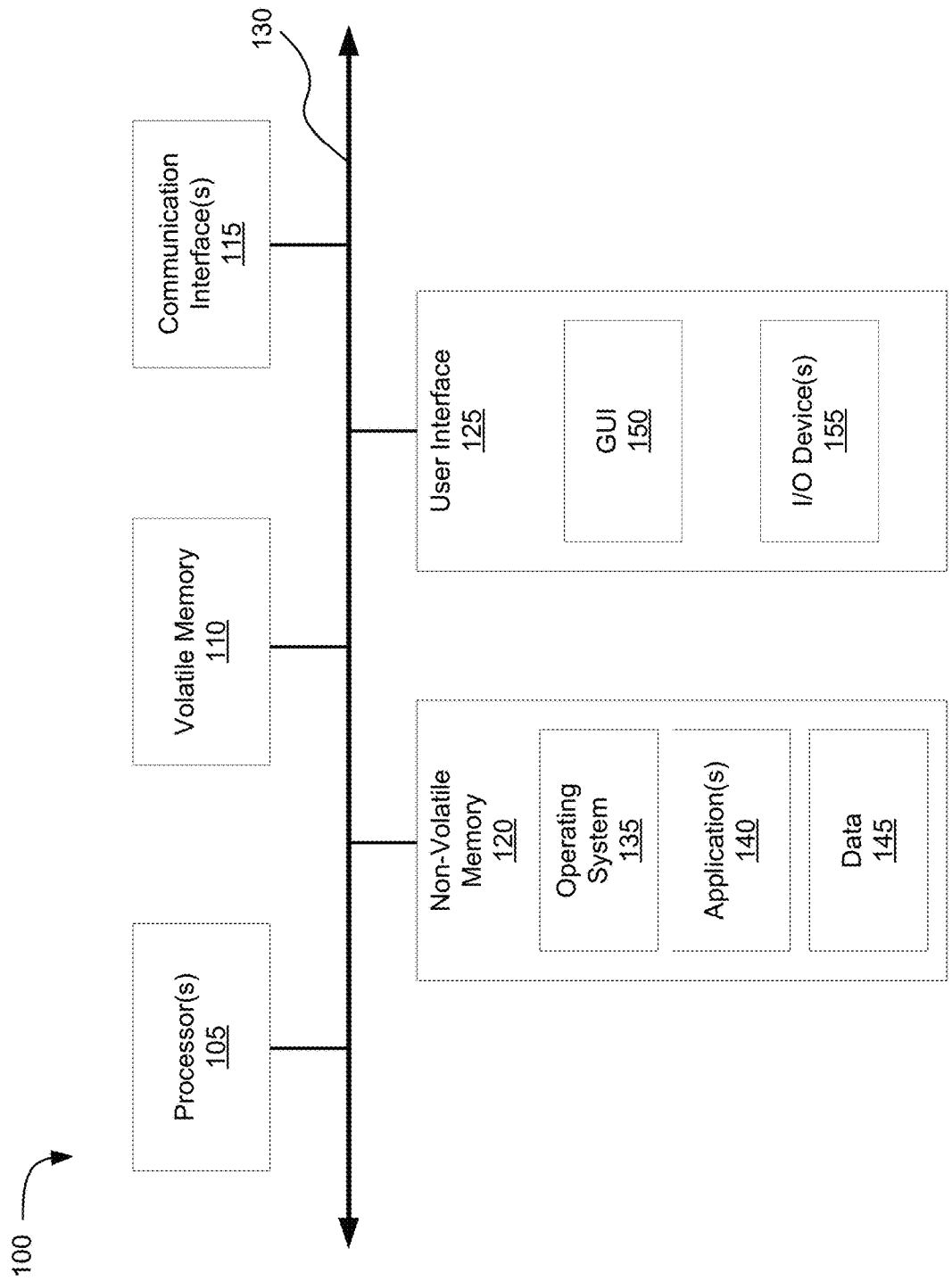
FIG. 1A is a block diagram of embodiments of a computing device.

Systems and methods of automatic detection of third party proxy network traffic are provided. In particular, this technical solution can automatically detect routing of network traffic through third party proxies and may provide actionable insights. For example, the system can determine whether a particular session, or a group of sessions, is routed through a third party proxy server, and may inform a system administrator that their traffic is routed through third party proxy and provide actionable insights for configuring proxy cloud service in their Gateway Server(s) to avoid session performance degradation.

Some organizations may route their network traffic, e.g., of virtual applications and/or desktop clients, through a third-party proxy server. The network traffic may go through the third-party proxy server before reaching an access gateway server (also referred to herein as access gateway device, gateway server or NetScaler gateway server). The extra hop through the third-party proxy server results in performance degradation of network sessions. For example, the network traffic (e.g., Citrix high-definition experience (HDX) traffic) through the additional hop tends to increase the session-unresponsiveness or the round trip time (RTT), thereby introducing latency or delays between transmissions. The increase in the session-unresponsiveness directly impacts user experience.

One way to avoid the routing of network traffic through third party proxies is to configure the gateway server(s), for virtual applications and/or desktop clients among other applications, as an exception from routing traffic third party proxies. This approach can include active configuration steps to be performed by system administrators to prevent the routing of network traffic for such applications through third party proxies. However, system administrators and/or other information technology (IT) personnel may inadvertently omit to configure the gateway server(s) correctly, and therefore allow traffic to be routed through third party proxies which eventually results in performance degradation of network sessions. The system administrators and/or other IT personnel may not even be aware of the routing of the traffic through third party proxies or its effect on sessions' performance.

Systems and methods of this technical solution can provide a mechanism to automatically detect routing of network traffic through third party proxies, and inform or alert system administrators or other entities of the routing of their traffic through third party proxies and/or the effect of such routing on session performance. The alerts can trigger the system administrators or other entities to properly configure their gateway server(s) to avoid any degradation in sessions' performances or any negative effect on user experience.

Thus, systems and methods described herein allow for automatic detection of automatic detection of third party proxy network traffic and providing actionable insights and troubleshooting capability. To do so, a web crawler can continuously or regularly monitor for or check classless inter-domain routing (CIDR) addresses registered by third party proxies. A data processing system can monitor transactional and/or usage events from a gateway server, and compare source IP addresses associated with the transactional and/or usage events to addresses registered by the third party proxies. The data processing system can provide an indication that network traffic is routed through a third party proxy server upon determining a match between a source IP address associated with a transactional and/or usage event and an IP address registered by the third party proxy server. The data processing system may detect session performance degradation, check the impact of routing the traffic through the third party proxy server and/or correlate the detected session performance degradation to such impact. The data processing system may recommend configuring the gateway server(s) as an exception to routing of user session traffic through third party proxies.

For purposes of reading the description of the various embodiments below, the following descriptions of the sections of the specification and their respective contents can be helpful:

Section A describes a computing environment which can be useful for practicing embodiments described herein.

Section B describes automatic detection of third party proxy network traffic.

A. Computing Environment

Prior to discussing the specifics of embodiments of the systems and methods of managing performance of elements in a multi-hop network topology, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
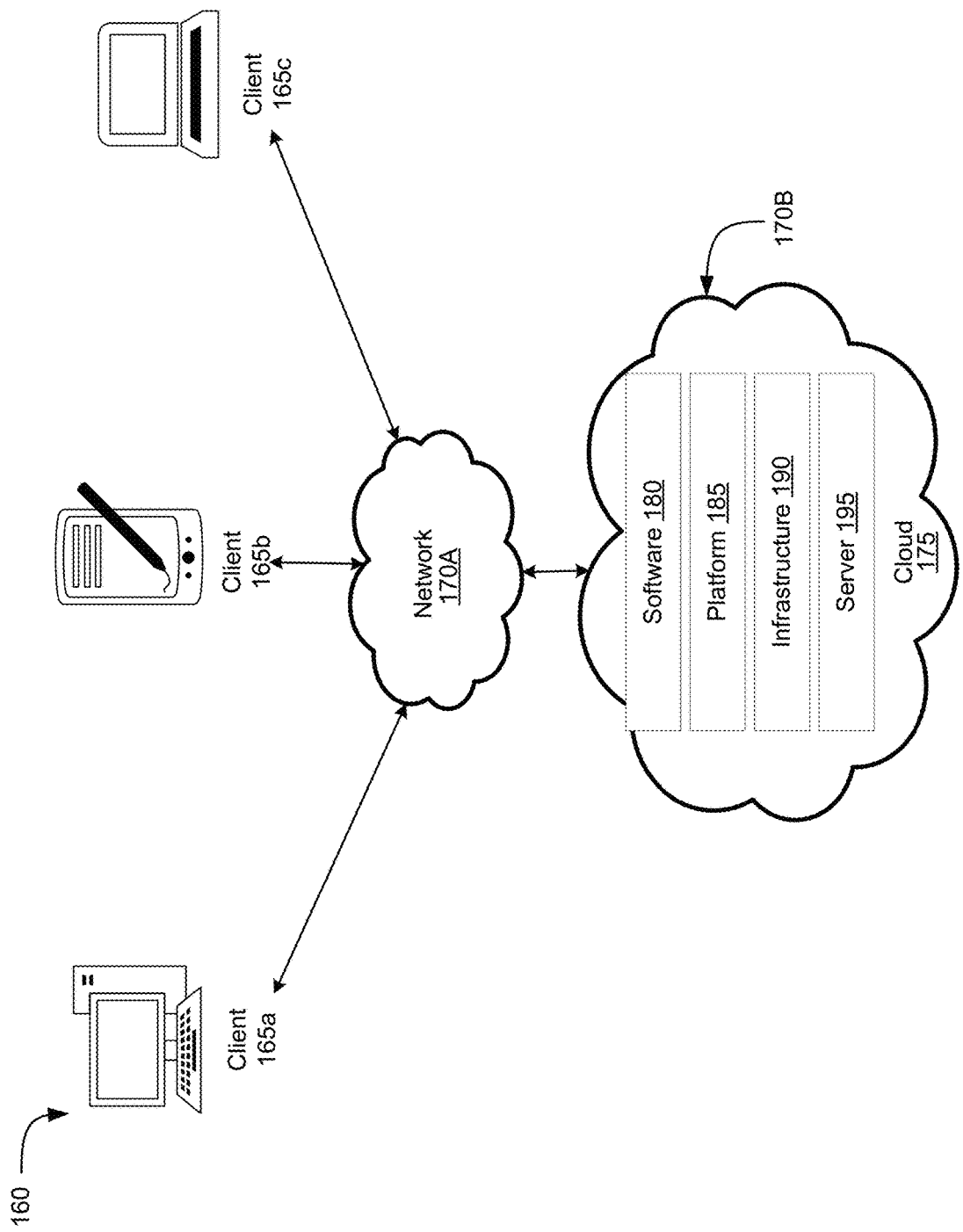
FIG. 1B is a block diagram depicting a computing environment comprising client devices in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide ondemand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Automatic Detection of Third Party Proxy Network Traffic

Systems and methods for automatic detection of third party proxy network traffic are provided. The detection of sessions routed through third party proxies allows for assessing the impact of such routing on session performance quality and user experience. The systems and methods described herein can include monitoring events reported by a gateway service and comparing source IP addresses associated with such events against CIDR addresses registered by third party proxies. Upon detecting a match between a source IP address associated with a given session and a CIDR address of a third party proxy, a data processing system can store an indication that the session is routed through the third party proxy.

The systems and methods described herein may include analyzing and/or quantifying the impact of routing sessions though third party proxies on session performance quality and user experience. The analysis results can be provided for access by system administrators, IT personnel or other individuals or entities. The systems and methods described herein may include recommending a configuration of the gateway service that prevents the routing of sessions associated with web applications, virtual applications, SaaS applications and/or desktop clients, among other applications, through third party proxies.

Figure 2:
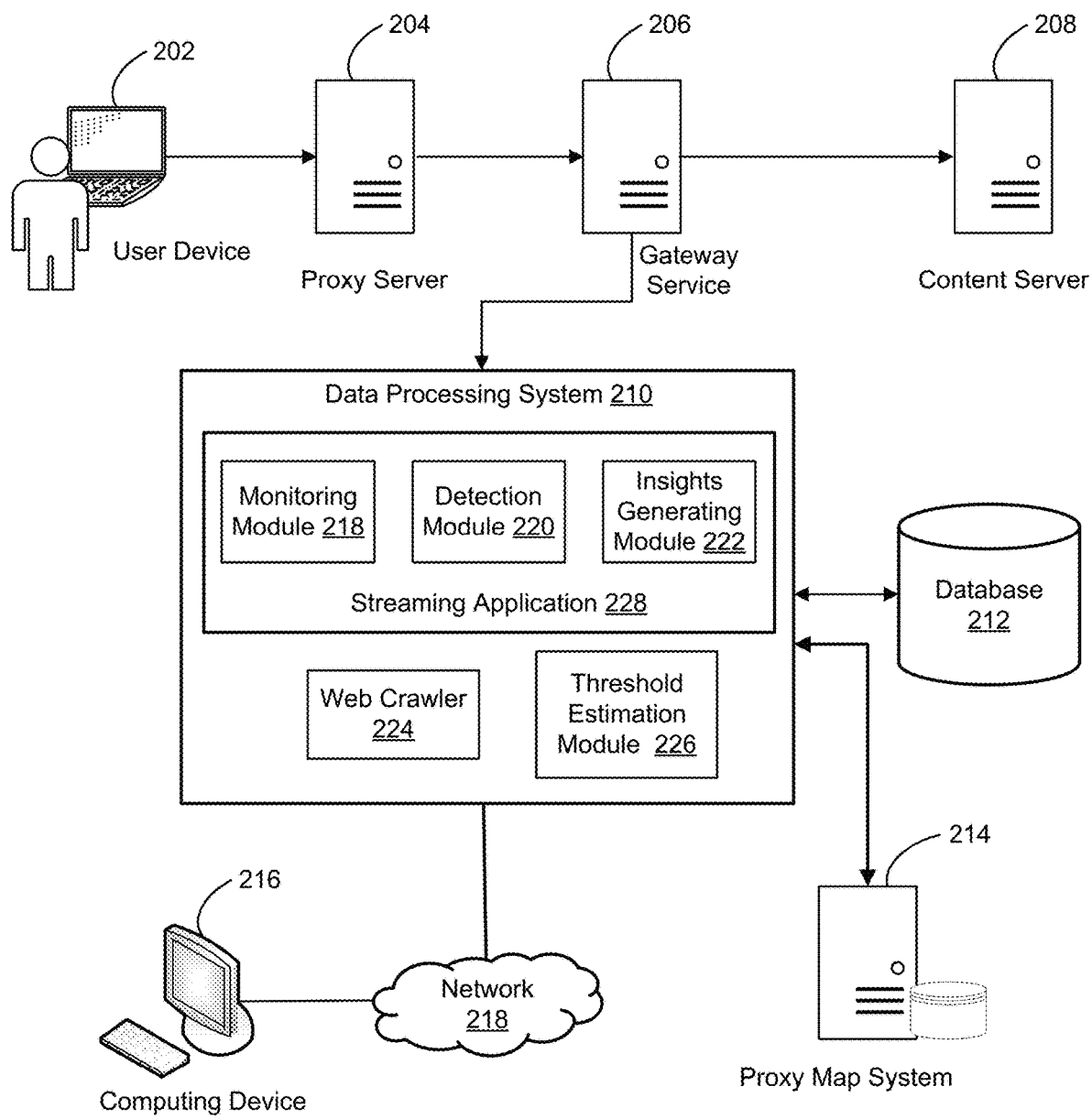
FIG. 2 is a block diagram of a system to automatically detect routing of network traffic through third party proxies, in accordance with an implementation.

Referring to FIG. 2, depicted is a block diagram of a system 200 for automatically detecting routing of network traffic through third party proxies, in accordance with an implementation. In brief overview, the system 200 can include a user device 202, a proxy server 204, a gateway server 206, a content server 208, a data processing system 210 and a database 212. The system 200 can include, or can be connected to, a proxy map system 214 and/or a computing device 216. The data processing system 210 can include a monitoring module 218, a detection module 220, an insights generating module 222, a web crawler 224 and a threshold estimation module 226. In some implementations, the data processing system 200 can include, or execute, a streaming application 228 (e.g., including the monitoring module 218, the detection module 220 and the insights generating module 222) for monitoring transactional and/or usage events reported by the gateway server 206 and detecting whether any sessions are routed through the third party proxy server 204. The data processing system 210 can be communicatively connected to one or more other devices, such as the computing device 216, via a communication network 218. The communication network 218 can include one or more components or functionalities of network 170A or 170B.

The system 200 can include the user device 202. The user device 202 can be or can include a client 165 as described above with regard to FIG. 1B. A user of the user device 202 can initiate a secure session, for example, to remotely access a web application, a SaaS application, a virtual application and/or a desktop client associated with a content server 208. The user device 202 can establish the session via the gateway server 206. The established session or corresponding traffic can be routed via the third party proxy server 204 and the gateway server 206.

The content server 208 can include a hardware computer server, a virtual server or a combination of both. In some implementations, the content server 208 can include a server of an enterprise network. The content server 208 can provide access to content associated with the enterprise network, such as content associated with web applications, virtual applications, SaaS applications and/or desktop clients, among other applications. While FIG. 2 shows a single user device 202 and a single content server 208, the system 200 can include multiple user devices 202 and multiple content servers 208. Each user device 202 can establish one or more corresponding user sessions with one or more content servers 208. The content servers 208 can be accessed via the gateway server(s) 206.

The gateway server 206 can include a hardware computer server, a virtual server or a combination of both. Each gateway server 206 can act as an access point to which users log on. Each gateway server 206 can have its own IP address, certificate, and policy set. The gateway server 206 can include one or more ports and a protocol to accept incoming traffic. The gateway server 206 can include or maintain connection settings, such as certificates, authentication, policies and intranet IPs among others. The gateway server 206 can generate logs, reports or information regarding transactional or usage events related to user sessions (or respective traffic) passing through or handled by the gateway server 206.

The third party proxy server 204 can include a hardware computer server, a virtual server or a combination of both. The third party proxy server(s) 204 can be associated with an entity different from the organization associated with the enterprise network and the provider of the gateway server(s) 206 or the corresponding gateway service. Session traffic between the user device 202 and the content server 208 can be routed through the third party proxy server 204. That is traffic transmitted by the user device 202 can be routed through the third party proxy server 204 before reaching the gateway server 206 and then the content server 208. Also, traffic from the content server 208 can go through the gateway server 206 and the third party proxy server 204 before reaching the user device 202.

While FIG. 2 shows a single third party proxy server 204 and a single gateway server 206, the system 200 can include a plurality of third party proxy servers 204 and/or a plurality of gateway servers 206. While the routing of the session through the third-party proxy server 204 may be avoided by properly configuring the gateway server 206 as an exception from third party proxies, system administrators, IT personnel or other individuals associated with the enterprise network may inadvertently or unknowingly omit to implement such configuration.

The routing of the session traffic through the third party proxy server 204 adds an unnecessary hop, e.g., the third party proxy server 204, to the traffic route and can result in session performance degradation. For example, the additional hop can result in increased RTT and session unresponsiveness. Such degradation leads to unsatisfactory user experience. Furthermore, monitoring and/or troubleshooting of the performance degradation of user sessions due to routing of traffic through third party proxy servers 204 can be technically challenging. In the current disclosure, logs or information generated by the gateway server(s) 206 regarding transactional and/or usage events can be used to automatically detect routing of session traffic through the third party proxy server 204, and provide actionable insights and/or assessment of the impact of routing traffic through the third party proxy server 204 based on detected sessions that are routed through the third party proxy server(s) 204.

The session traffic can go through the gateway server(s) 206, e.g., after passing through the third party proxy server 204. In the case where session traffic is routed through the third party proxy server 204, the logs or information generated by the gateway server 206 will indicate the IP address (or source IP address) of the third party proxy server 204, e.g., as a source or destination of data traffic. The logs, reports or information generated by the gateway server 206 can be accessible by the data processing system 210 and/or other devices of the system 200.

The data processing system 210 can include one or more computer devices, such as computer device 100 of FIG. 1A. For instance, the data processing system 210 can include one or more processors, such as processor 105, and a memory such as memory 110 or memory 120. The data processing system 210 can monitor events' data, e.g., logs, reports or information, generated by the gateway server 206 to detect user sessions routed through the third party proxy server 204 based on IP addresses listed in the events' data. The data processing system 210 can include the monitoring module 218, the detection module 220, the insights generating module 222, the web crawler 224 and the threshold estimation module 226. In some implementations, the data processing system 210 can include or execute the streaming application 228, which may include the monitoring module 218, the detection module 220 and the insights generating module 222, to detect sessions routed through the third party proxy server 204. Each of the modules of the data processing system 210 can be implemented as software, firmware, hardware or a combination thereof.

The web crawler 224 can crawl the web to identify domain addresses registered for the third party proxy servers 204. For instance, the web crawler 224 can continuously or regularly crawl on a registered set of third party proxy web pages. For example, given a set D={$d_1, d_2, \ldots, d_n$} of IP addresses of third party proxy servers 204 that is maintained by the data processing system 210 where $d_i$ represents an already known IP address associated with the $i^{th}$ third party proxy server, the web 224 can crawl web pages associated with these IP addresses to identify other CIDR IP addresses associated with the third party proxy servers 204 have purchased. For instance, a web page associated with an IP address $d_i$ in the set D can include links to other webpages or can include IP addresses of other servers of the same organization owning or managing the third party proxy server associated with the IP address $d_i$. The set D can be a static set that is found through domain expertise. In some implementations, the data processing system 210 can use a web hook that can identify and/or continuously or regularly update all available third party proxy servers in the market.

The web crawler 224 can identify for each new CIDR IP address the corresponding domain address and corresponding subnet. The web crawler 224 can extrapolate the domain addresses to identify all possible IP addresses of the third party proxy server 204 through which session traffic may be routed. The web crawler 224 can use different combinations of domain addresses and subnets to identify all possible IP addresses associated with the third party proxy server 204. The web crawler 224 may further determine for each new IP address associated with third party proxy servers the corresponding geolocation. For instance, the web crawler 224 may search the web for information about each newly identified IP address.

In some implementations, the web crawler 224 may crawl the web based on a time interval. For example, the web crawler 224 can schedule a CRON job running daily at a predefined time interval to find or identify differences (e.g., with respect to already identified IP addresses of the third party proxy servers 204) in any new address or a corresponding CIDR address associated with the third party proxy servers 204. The web crawler 224 can update the data structures maintained/stored in the proxy map system 214 based on the identified difference. For example, the web crawler 224 can use the identified difference to identify additional possible IP addresses associated with the third party proxy servers 204, and store the additional possible IP addresses in the data structures maintained in the proxy map system 214.

The web crawler 224 can provide the newly identified IP addresses and corresponding geolocations to the proxy map system 214. The proxy map system 214 can include a database for storing IP addresses associated with third party proxy servers 204 and corresponding geolocations. For instance, the proxy map system 214 generate and/or maintain one or more data structures storing all the possible IP addresses associated with the third party proxy server 204 (e.g., IP addresses extrapolated from the domain addresses) and corresponding geolocations. Each IP address can be mapped to, or associated with, the corresponding geolocation.

The monitoring module 218 can monitor continuously or regularly monitor the transactional and/or usage events recorded by the gateway server 206. For instance, the monitoring module 218 can regularly or continuously check the transactional and/or usage logs generated by the gateway server 206 for new recorded events. The monitoring module 218 may access the log(s) periodically or each time the log(s) is/are updated by the gateway server 206, and obtain new data records (or data frames) added or modified in the log(s) and indicative of recent events.

The detection module 220 can be configured to determine or detect whether a session or corresponding traffic is routed via the third party proxy server 204. The detection module 220 can receive events information obtained by the monitoring module 218, and can scan the events information to identify the IP address for each event. The detection module 220 can access the proxy maps or data structures in the proxy map system 214, and compare the IP address of each event to IP addresses stored in the proxy map system 214. If a match is detected, the detection module 220 can determine the session of the event with the matched IP address as a session routed through a third party proxy server 204. The detection module 220 can update the logs of the gateway server(s) 206 (e.g., by adding a Boolean parameter) to indicate that the session of the event with the matched IP address is routed via third party proxy server 204. The detection module 220 may further add the IP address of the third party proxy server and the corresponding geolocation to the logs.

The insights generating module 222 can scan the updated logs to distinguish between sessions or traffic routed via third party proxy servers 204 and sessions or traffic that is not routed through any third party proxy server 204. The logs can include user experience or session performance metrics, such as the RTT. The insights generating module 222 can compare the user experience or session performance metrics for sessions routed through third party proxy servers 204 to one or more corresponding threshold values to determine whether the routing through the third party proxy servers 204 resulted in session performance or user experience degradation. For instance, the one or more threshold values can include a RTT threshold value determined based on RTT values associated with sessions not routed via third party proxy servers 204. The insights generating module 222 can generate and send alerts or insights information indicative of the degradation in user experience or session performance to system administrator or IT personnel. For instance, the alerts or insights information can illustrate or depict the difference between the recorded user experience or session performance metric and the corresponding threshold. The insights generating module 222 may send the alerts or the insights information to the computing device 216 associated with a system administrator or IT personnel. In some implementations, the alerts or the insights information can include a recommendation to reconfigure the gateway server 206 as an exception to routing via third party proxy servers 204.

The threshold estimation module 226 can estimate or update threshold value(s) for user experience or session performance metrics. For instance, the threshold estimation module 226 can continuously estimate or update the threshold value(s). For example, the threshold estimation module 226 can use RTT values associated with recent sessions not routed via third party proxy servers 204 to update or estimate the threshold value for acceptable RTT. Recent sessions can include, for example, sessions in the last 24 hours, sessions in the last 12 hours or the K last sessions where K is an integer number, among others. The threshold value for acceptable RTT can be indicative of an upper bound of acceptable RTT when the session is not routed via any third party proxy server 204. The threshold value can be used by the insights generating module to detect session performance or user experience degradation due to session routing via third party proxy servers 204.

Figure 3:
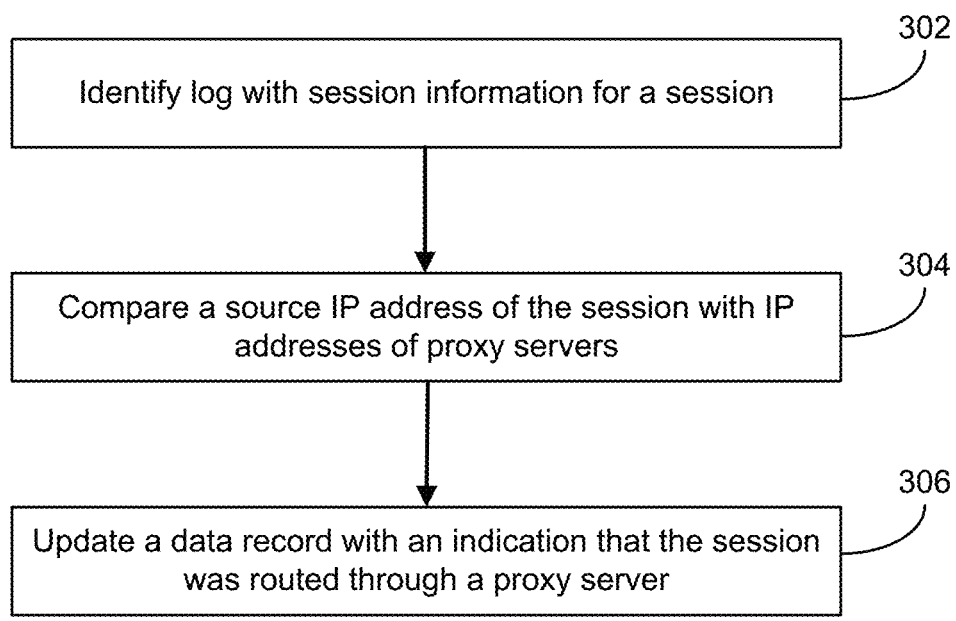
FIG. 3 depicts an example method for automatic detection of third party proxy network traffic, in accordance with an implementation.

Referring now to FIG. 3, a flowchart depicting an example method 300 for automatic detection of third party proxy network traffic is shown, in accordance with an implementation. The method 300 can be performed by the data processing system 210, including, for example, the streaming application 228. In brief overview, the method 300 can include identifying a log with session information for a session (STEP 302). The method 300 can include comparing a source IP address of the session with IP addresses of proxy servers (STEP 304). The method 300 can include updating a data record with an indication that the session was routed through a proxy server (STEP 306).

Referring to FIGS. 2 and 3, the method 300 can include the data processing system 210 or the application 228 identifying a log with session information for a session (STEP 302). The session can include a user session established between the user device 202 and a content server 208. The session can be associated with a web application, a SaaS application, a virtual application and/or a desktop client that is accessed by the user device 202. The session can traverse, or can be routed through, the gateway server 206. The gateway server 206 can generate a log including session information of the session. The gateway server 206 can generate a log (e.g., an electronic document) including session information for all, or a plurality of, sessions traversing the gateway server 206. The log can include information indicative of transactional and/or usage events of the sessions traversing the gateway server 206. The log can include a data record for each transactional and/or usage event. The transactional and/or usage events can include requests, data transfer events and/or initiation of processes executed by the content server 208, among other events. Each data record of a corresponding session event can include an IP address (referred to herein as a source IP address) of a computer device associated with the event (e.g., the computer device sending a request to the gateway server 206). The data record may include an identifier of the corresponding session, a timestamp indicative of the timing of the event, a type or description of the event, a communication port associated with the event or combination thereof. In some implementations, the gateway server 206 may generate a separate log for transactional events and another log for usage events. In some implementations, the gateway server 206 may generate a separate log for each session, where the log can include only session information specific to that session.

Identifying the log can include the data processing system 210 or the application 228 determining a name and/or a storage location of the log and continuously or regularly accessing the log. The application 228 can be a structured streaming application that is continuously running on the data processing system 210. The application 228 can cause the data processing system 210 to continuously or regularly monitor or listen on the transactional and/or usage events recorded by the gateway server 206. For instance, the application 228 when executed can cause the data processing system 208 to regularly or continuously check the transactional and/or usage logs for new recorded events. In some implementations, the application 228 can cause the data processing system 210 to access the log(s) periodically or each time the log(s) is/are updated by the gateway server 206, and obtain new data records (or data frames) added or modified in the log(s) and indicative of recent events.

The data processing system 201 can scan the new data records or data frames and identify, for each new data record or data frame, the corresponding session and a source IP address for the session. For example, each data record or data frame indicative of a respective event can include a "sourceIPv4AddressesRx" field or parameter indicative of the source IP address for the corresponding session. The source IP address can be in decimal notation for enhanced security. The decimal notation can be a transformation of the IP address to a decimal representation. More generally, the source IP address can be in a transformed representation that obscures or conceals the actual source IP address from potential intruders. The data processing system 210 can identify the session via session identifiers (IDs). In the case where the session is routed through the third party proxy server 204, the source IP address of the session can be, or can include, an IP address associated with the gateway server 206. In other words, since session traffic is routed through the third party proxy server 204, the gateway server 206 will be communicating with the third party proxy server 204 with regard to handling session requests and/or transfer of session traffic. Accordingly, the gateway server 206 can record the IP address associated with the third party proxy server 204 as the source IP address of the session from which a request (associated with was received.

The method 300 can include comparing the source IP address of the session with IP addresses of proxy servers (STEP 304). The data processing system 210 or the application 228 can compare the source IP address of each session against a plurality of IP addresses associated with third party proxies maintained in the proxy map system 214. The IP addresses can be maintained in the proxy map system 214 in a decimal notation or transformed representation for enhanced security. The proxy map system 214 can include a database of IP addresses associated with third party proxies that is continuously or regularly updated.

The data processing system 210 can crawl a plurality of web pages to identify domain addresses registered for the third party proxy servers 204. The data processing system 210 can include, or can execute, the web crawler 224, which can continuously or regularly crawl on a registered set of third party proxy web pages. For example, given a set $D=\{d_1, d_2, \ldots, d_n\}$ of IP addresses of third party proxy servers 204 that is maintained by the data processing system where $d_i$ represents an already known IP address associated with the $i^{th}$ third party proxy server, the web crawler (or the data processing system 210 when running the web crawler) can crawl web pages associated with these IP addresses to identify other IP addresses that organizations associated with the third party proxy servers 204 have purchased. For instance, a web page associated with an IP address $d_i$ in the set D can include links to other webpages or can include IP addresses of other servers of the same organization owning or managing the third party proxy server associated with the IP address $d_i$. The set D can be a static set that is found through domain expertise. In some implementations, the data processing system 208 can use a web hook that can identify and/or continuously or regularly update all available third party proxy servers in the market.

Once the web crawler identifies, via the web pages, other CIDR IP addresses associated with a third party proxy server 204, the data processing server system 210 or the application 228 can identify for each CIDR IP address the corresponding domain address and corresponding subnet. The data processing system 210 can extrapolate the domain addresses to identify all possible IP addresses of the third party proxy server 204 through which session traffic may be routed. The data processing system can use different combinations of domain addresses and subnets to identify all possible IP addresses associated with the third party proxy server 204. The data processing system 210 or the application 228 can generate and/or maintain one or more data structures storing all the possible IP addresses associated with the third party proxy server 204 (e.g., IP addresses extrapolated from the domain addresses). The data processing system 210 or the application 228 can store or maintain the data structures in the proxy map system 214.

In some implementations, the data processing system 210 or the web crawler 224 may crawl the plurality of web pages associated with the third party proxy servers 204 based on a time interval. For example, the data processing system 210 or the web crawler 224 can schedule a CRON job running daily at a predefined time interval to find or identify differences (e.g., with respect to already identified IP addresses of the third party proxy servers 204) in any new address or a corresponding CDR address associated with the third party proxy servers 204. The data processing system 210 can update the data structures maintained/stored in the proxy map system 214 based on the identified difference. For example, the data processing system 210 can use the identified difference to identify additional possible IP addresses associated with the third party proxy servers 204, and store the additional possible IP addresses in the data structures maintained in the proxy map system 214.

In some implementations, the data processing system 210 or the web crawler 224 can determine geographic locations of the third party proxy servers 204, and associate the geographic locations with the IP addresses in the data structures maintained in the proxy map system 214. For example, the data processing system 210 or the web crawler 228 can fetch or search for the geolocation corresponding to each IP address of the third party proxy servers 204, and store or maintain a map or an association between each IP address of the third party proxy servers 204 and the corresponding geolocation as part of the data structures maintained by the proxy map system 214. The map or association can be in the form of M={("XX.YY.AA.ZZ", "ABC"), . . . } where each IP address "XX.YY.AA.ZZ" is mapped to or associated with the corresponding geolocation "ABC" in the data structures. The data structures can include one or more tables, one or more linked lists, one or more trees or a combination thereof, among others.

In some implementations, the proxy map system 214 can be part of the data processing system 210. In some implementations, the proxy map system 214 can be a separate system from, but communicatively coupled to, the data processing system 210. The proxy map system 214 can include the web crawler 224 and/or can schedule the CRON job. The data structures generated and maintained by the proxy map system 214 can be accessible to the data processing system 210 or the application 228.

The data processing system 210 or the application 228 can compare the source IP address of the session identified from the log(s) of the gateway server 206 to the IP addresses associated with the third party proxy servers 204 maintained in the proxy map system 214. If a match is determined between the source IP address and one of the IP addresses (or a third party proxy server 204) maintained by the proxy map system 214, the data processing system 210 or the application 228 can determine or flag the corresponding session to be routed through the third party proxy server 204 associated with IP address matching the source IP address.

The method 300 can include updating a data record with an indication that the session was routed through a proxy server (STEP 306). In some implementations, the data processing system 210 or the application 228 can update the log(s) of the gateway server 206 to indicate that the session associated with the source IP address that is matched to a third party proxy IP address is routed through the third party proxy server associated with the third party proxy IP address. For instance, the data processing system 210 or the application 228 can update one or more data records of the log(s) indicative of one or more events of the session to add or incorporate a Boolean field indicating that the session (or the corresponding traffic) is routed through the third party proxy server 204. In some implementations, the data processing system 210 or the application 228 can update one or more data records of the log(s) to add or incorporate the geolocation of the third party proxy server 204 obtained from the proxy map system 214.

In some implementations, the data processing system 210 or the application 228 can send an indication of the matching between the source IP address and the third party proxy IP address, and indication that the session is routed through the third party proxy server 204, the geolocation of the third party proxy server 204 or a combination thereof to the gateway server 206. The gateway server 204 can use the data received from the data processing system 210 or the application 228 to update the respective log(s). In some implementations, the data processing system 210 or the application 228 can store or maintain the indication that the session is routed through the third party proxy server 204 and/or the geolocation of the third party proxy server 204 in one or more separate data structures, e.g., in the database 212. For instance, the data processing system 210 or the application 228 can store or maintain in the database 212 a mapping or association between the session ID of each session that is routed via a third party proxy server 204 and an IP address or identifier of the third party proxy server 204. The mapping or association may further include the geolocation of the third party proxy server 204 through which the session is routed.

In some implementations, the data processing system 210 or the application 228 can generate an alert based on the session information in the updated log or the indication that the session is routed through a third party proxy server 204. The alert can include the indication that the session is routed through the third party proxy server 204 and/or a recommendation to modify a routing configuration of the gateway server 206 to prevent routing through third party proxies.

The data records associated with different session events (for different sessions) in the log(s) of the gateway server 206 can include an additional set of information about the session performance and/or user experience metrics. For instance, the log(s) can include a plurality of records for a plurality of sessions between a plurality of user devices 202 and a plurality of content servers 208. The plurality of records can include session performance and/or user experience metrics of the corresponding sessions. Such metrics can include, for example, RTT values and/or or unresponsiveness events for different events and/or sessions. The data processing system 210 or the application 228 can compare the session performance and/or user experience metrics for sessions that were not routed through third party proxy servers 204 to session performance and/or user experience metrics for sessions that were routed through third party proxy servers 204. In some implementations, the data processing system 210 or the application 228 can compare the session performance and/or user experience metrics for sessions that were routed through third party proxy servers 204 to a threshold value that is determined based on session performance and/or user experience metrics for sessions that were not routed through any third party proxy server 204.

For instance, the data processing system 210 or application 228 can update a first subset of the plurality of records for a first subset of the plurality of sessions with an indication that the first subset of the plurality of sessions were routed through one or more third party proxy servers 204 based on source IP addresses of the first subset of the plurality of sessions matching one or more IP addresses of the third party proxy servers 204. The data processing system 210 or the application 228 can generate a proxy performance metric based on the session information stored in the first subset of the plurality of records. For instance, the proxy performance metric can include one or more RTT values for each session of the first subset of the plurality of sessions. The data processing system 210 or the application 228 can generate a threshold performance metric based on the session information stored in a second subset of the plurality of records corresponding to a second subset of sessions that were not routed through any of the third party proxy servers 204. The threshold performance metric can be a time to live (TTL) metric that represents a RTT threshold for the second subset of sessions that were not routed through any of the third party proxy servers 204. The TTL can be statistically computed over a predefined time period, e.g., 24 hours or 12 hours among others, based on the expected user experience.

The data processing system 210 or the application 228 may keep track of RTT values (or other session performance or user experience metric values) for sessions not routed via any third party proxy server 204. The data processing system 210 or the application 228 can use the RTT values for recent sessions (e.g., with the last 12 hours or the last 24 hours, among others) not routed via any third party proxy server 204 to determine an RTT threshold (or upper bound) for acceptable RTTs. The data processing system 210 or the application 228 may employ statistical analysis of the RTT values to determine the corresponding threshold. For example, the data processing system 210 or the application 228 may use the 90% quantile or the 95% quantile or other statistical parameter of the RTT values as the RTT threshold. The RTT threshold can be indicative of a TTL for user sessions.

The data processing system 210 or the application 228 can compare the proxy performance metric (e.g., RTT values or maximum RTT value) for each session of the first subset of the plurality of sessions to the threshold performance metric (e.g., TTL) for the second subset of sessions to determine any degradation in session performance and/or user experience due to routing of the first subset of sessions routed through the one or more third party proxy servers 204. The comparison allows for correlating the degradation in session performance and/or user experience to routing through the third party proxy servers 204. The data processing system 210 or the application 228 can store, e.g., in the database 212 and/or in the log(s) of the gateway server 206, performance data depicting the difference between the threshold performance metric (e.g., TTL) for the second subset of sessions and the proxy performance metric (e.g., RTT values or maximum RTT value) for each session of the first subset of sessions. The data processing system 210 or the application 228 can provide a dashboard reporting the proxy performance metric and the threshold performance metric. The dashboard can be accessible by the computing device(s) 216 associated with system administrators or IT personnel for enterprise networks. The data processing system 210 or the application 228 can generate an alert based on the comparison between the proxy performance metric and the threshold performance metric, and send the alert to the computing device(s) 216. The alert can include a recommendation to configure, or modify a routing configuration, of the gateway server 206 to prevent routing of session traffic through third party proxy servers 204.

Figure 4:
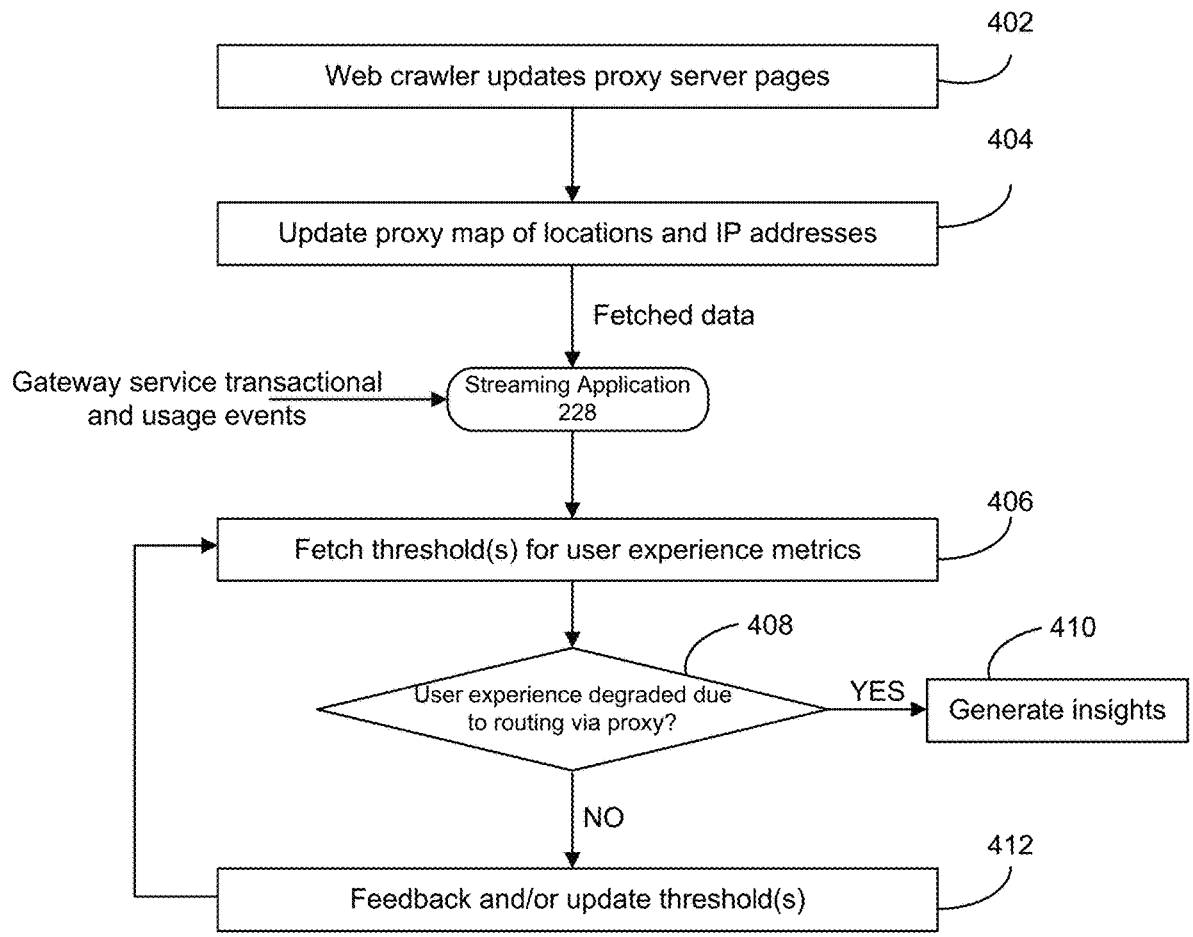
FIG. 4 depicts an example method for monitoring network traffic and automatically detecting routing of traffic via third party proxies, in accordance with an implementation.

Referring now to FIG. 4, a flow chart depicting an example method 400 for monitoring network traffic and automatically detecting routing of traffic via third party proxies is shown, in accordance with an implementation. The method 400 can be performed by one or more components or system depicted in FIGS. 1A, 1B, or 2, including, for example, a data processing system. The method 400 can include the web crawler 224 updating the IP addresses or the web pages of the third party proxy servers 204 (STEP 402). The web crawler 224 can search the web to identify new IP addresses associated with third party proxy servers 204. The web crawler 224 may further identify geolocations associated with the IP addresses of third party proxies.

The web crawler 224 can store or maintain identified IP addresses and corresponding geolocations in the proxy map system 214 (STEP 404). The proxy map system 214 can maintain one or more data structures storing and mapping each proxy IP address to corresponding geolocation.

The streaming application 228 can access or obtain information indicative of transactional and/or usage events as well as information indicative of proxy IP information stored or maintained in the proxy map system 214. The application 228 can continuously or regularly access or fetch logs generated by the gateway server(s) 206 to identify or determine new transactional and/or usage events. The method 400 can include the application 228 fetching or obtaining a threshold for user experience (or session performance) metric (STEP 406). The user experience metric threshold can be a RTT threshold. The RTT threshold can be indicative of or can represent a TTL for user sessions.

The method 400 can include the application 228 or the data processing system 210 comparing IP addresses associated with transactional and/or usage events with proxy IP addresses maintained by the proxy map system 214, and comparing the user experience (or session performance) metric of a given session to the threshold to determine whether user experience is degraded due to routing via the third party proxy (STEP 408). A match between an event IP address and a proxy IP address indicates that the session including the event is routed via a third party proxy server 204. The user experience (or session performance) metric of the session exceeding the threshold (e.g., RTT larger than threshold) can be indicative of a degraded user experience or degraded session performance.

If user experience degradation is detected, the application 228 or the data processing system 210 can generate insights and/or alerts for sending to system administrators or IT personnel (STEP 410). As discussed above with regard to FIGS. 2 and 3, the insights can include information indicative of the user experience (or session performance) degradation in correlation with the routing of the session via the third party proxy server 204. For instance, the insights can include an indication of the routing via the third party proxy server 204 and an illustration of the user experience (or session performance) metric for a session in comparison with the metric threshold. The insights can include a recommendation to reconfigure the gateway server(s) 206 to prevent routing of session traffic via third party proxy servers 204.

In the case where no routing via third party proxy servers 204 and user experience degradation are detected, the data processing system 210 or the threshold estimation module 226 can use the user experience (or session performance) metric for the session to update the metric threshold at 412. For instance, the data processing system 210 or the threshold estimation module 226 can use the user experience (or session performance) metrics for recent sessions (e.g., in the last 24 hours or in the last 12 hours, among other durations) to update or estimate the metric threshold. The metric threshold can be updated based on a comparison of performance metrics between sessions routed through third-party proxy servers and session that are not routed through third-party proxy servers.

The above-mentioned elements or entities may be implemented in hardware, or a combination of hardware and software, in one or more embodiments. Components may be implemented using hardware or a combination of hardware or software detailed above in connection with FIGS. 1A-1B. For instance, these elements or entities can include any application, program, library, script, task, service, process or any type and form of executable instructions executing on hardware of a device. The hardware includes circuitry such as one or more processors in one or more embodiments.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

It will be further understood that various changes in the details, materials, and arrangements of the parts that have been described and illustrated herein may be made by those skilled in the art without departing from the scope of the following claims.

What is claimed is:

1. A method, comprising:
  crawling, by a data processing system comprising one or more processors and memory, a plurality of web pages to identify domain addresses registered for proxy servers;
  extrapolating, by the data processing system, the domain addresses to identify internet protocol ("IP") addresses of the proxy servers;
  generating, by the data processing system, a data structure with the IP addresses extrapolated from the domain addresses in the data structure;
  identifying, by the data processing system, a log with session information generated by a device for a session established between a client and a server traversing the device;
  comparing, by the data processing system, a source IP address for the session identified from the log with the IP addresses of the proxy servers; and
  updating, by the data processing system responsive to a match based on the comparison, the log with an indication that the session was routed through a proxy server.

2. The method of claim 1, further comprising crawling, by the data processing system, the plurality of web pages based on a time interval.

3. The method of claim 1, further comprising:
determining, by the data processing system, geographic locations of the proxy servers; and
associating, by the data processing system, the geographic locations with the IP addresses in the data structure.

4. The method of claim 1, further comprising updating, by the data processing system, the log to include a geographic location of the proxy server.

5. The method of claim 1, further comprising generating, by the data processing system, an alert based on the session information in the updated log to modify a routing configuration of the device that generated the log.

6. The method of claim 1, wherein the log comprises a plurality of records for a plurality of sessions between a plurality of client devices and a plurality of servers.

7. The method of claim 6, further comprising:
updating, by the data processing system, a first subset of the plurality of records for a first subset of the plurality of sessions with an indication that the first subset of the plurality of sessions were routed through one or more proxy servers based on source IP addresses of the first subset of the plurality of sessions matching one or more IP addresses of the proxy servers;
generating, by the data processing system, a proxy performance metric based on the session information stored in the first subset of the plurality of records; and
generating, by the data processing system, a threshold performance metric based on the session information stored in a second subset of the plurality of records corresponding to a second subset of sessions that were not routed through any of the proxy servers.

8. The method of claim 7, further comprising generating, by the data processing system, an alert based on a comparison between the proxy performance metric and the threshold performance metric.

9. The method of claim 7, further comprising generating, by the data processing system, a dashboard reporting the proxy performance metric and the threshold performance metric.

10. A system, comprising:
a data processing system comprising one or more processors and memory to:
crawl a plurality of web pages to identify domain addresses registered for proxy servers;
extrapolate the domain addresses to identify internet protocol ("IP") addresses of the proxy servers;
generate a data structure with the IP addresses extrapolated from the domain addresses in the data structure;
identify a log with session information generated by a device for a session established between a client and a server traversing the device;
compare a source IP address for the session identified from the log with the IP addresses of the proxy servers; and
update, responsive to a match based on the comparison, the log with an indication that the session was routed through a proxy server.

11. The system of claim 10, wherein the data processing system is further configured to crawl the plurality of web pages based on a time interval.

12. The system of claim 10, wherein the data processing system is further configured to:
determine geographic locations of the proxy servers; and
associate the geographic locations with the IP addresses in the data structure.

13. The system of claim 10, wherein the data processing system is further configured to update the log to include a geographic location of the proxy server.

14. The system of claim 10, wherein the data processing system is further configured to generate an alert based on the session information in the updated log to modify a routing configuration of the device that generated the log.

15. The system of claim 10, wherein the log comprises a plurality of records for a plurality of sessions between a plurality of client devices and a plurality of servers.

16. The system of claim 15, wherein the data processing system is further configured to:
update a first subset of the plurality of records for a first subset of the plurality of sessions with an indication that the first subset of the plurality of sessions were routed through one or more proxy servers based on source IP addresses of the first subset of the plurality of sessions matching one or more IP addresses of the proxy servers;
generate a proxy performance metric based on the session information stored in the first subset of the plurality of records; and
generate a threshold performance metric based on the session information stored in a second subset of the plurality of records corresponding to a second subset of sessions that were not routed through any of the proxy servers.

17. A non-transitory computer readable storage medium comprising processor executable instructions that, when executed, cause one or more processors to:
maintain, via continuous web crawling, a data structure with IP addresses of proxy servers and associated geographic locations of the proxy servers;
receive one or more logs for sessions between a plurality of clients and a plurality of servers that traverse one or more devices;
update, based on a comparison between source IP addresses stored in the one or more logs and the IP addresses maintained in the data structure, the one or more logs with an indication that a session was routed through a proxy server of the proxy servers and the associated geographic location;
determine that a performance of the session is degraded relative to a performance of sessions of the one or more logs not routed through any proxy servers; and
generate an alert responsive to the determination that the performance of the session is degraded.

* * * * *